United States Patent [19]

Patel et al.

[11] Patent Number: 5,040,876

[45] Date of Patent: Aug. 20, 1991

[54] LIQUID CRYSTAL LIGHT MODULATORS WITH ASYMMETRICAL INTERFACES

[75] Inventors: Jayantilal S. Patel, Middletown; Sin-Doo Lee, Eatontown, both of N.J.

[73] Assignee: Bell Communications Research, Inc., Livingston, N.J.

[21] Appl. No.: 490,155

[22] Filed: Mar. 7, 1990

[51] Int. Cl.$^5$ .............................................. G02F 1/13
[52] U.S. Cl. .................................. 350/333; 350/341; 350/331 R
[58] Field of Search ............... 350/331 R, 333, 339 R, 350/340, 341, 346, 347 E, 347 V, 347 R, 390, 355, 356; 340/784

[56] References Cited

U.S. PATENT DOCUMENTS

| | | | |
|---|---|---|---|
| 3,914,020 | 10/1975 | Helfrich | 350/340 |
| 4,084,884 | 4/1978 | Raynes | 350/334 |
| 4,221,471 | 9/1980 | Gurtler | 350/331 R |
| 4,561,726 | 12/1985 | Goodby et al. | 350/341 |
| 4,564,266 | 1/1986 | Durand et al. | 350/341 |
| 4,601,542 | 7/1986 | Meyer | 350/331 R |
| 4,601,544 | 7/1986 | Cheng et al. | 350/341 |
| 4,838,663 | 6/1989 | Lagerwall et al. | 350/341 |
| 4,917,475 | 4/1990 | Meyer et al. | 350/346 |
| 4,927,244 | 5/1990 | Bahr et al. | 350/347 E |

OTHER PUBLICATIONS

"Linear Flexo-Electro-Optic Effect in a Hybrid Aligned Nematic Liquid Crystal Cell", N. V. Madhusudana et al., J. Physique Lett. 46, pp. L-195-L-200, 1985.

"Flexoelectrically Controlled Twist of Texture in a Nematic Liquid Crystal", I. Dozov et al., J. Physique Lett. 43, pp. L-365-L-369, 1985.

Primary Examiner—Stanley D. Miller
Assistant Examiner—Tai Van Duong
Attorney, Agent, or Firm—James W. Falk; Leonard Charles Suchyta

[57] ABSTRACT

Liquid crystal devices whose light transmission properties are respectively responsive to the polarity of an applied voltage enable the realization of high-speed modulators useful for communication and display purposes. Such a polar effect is achieved by establishing asymmetrical interfacial interactions between the surfaces of a liquid crystal layer and alignment layers disposed in respective contact with the surfaces. Asymmetry is introduced in the form of either different anchoring strengths or different tilt angles for liquid crystal molecules at the two surfaces. In either case, both quiescently and in response to an electric field applied perpendicular to the surfaces of the liquid crystal layer, the contour of the longitudinal axes of the molecules is thereby established to have different curvatures, each less than about 45 degrees, at the two surfaces.

15 Claims, 3 Drawing Sheets

LIQUID CRYSTAL LIGHT MODULATORS WITH ASYMMETRICAL INTERFACES

BACKGROUND OF THE INVENTION

This invention relates to light modulators and, more particularly, to high-speed light modulators whose operation is based on varying the electro-optic properties of liquid crystal materials.

Liquid crystal light modulators are useful in a variety of applications of practical importance. They may, for example, be employed in a data communication system to modulate a serial stream of optical pulses. Or such modulators may be arranged in a two-dimensional array to form a flat panel display.

Many available liquid crystal light modulators exhibit relatively slow response times. In practice, this property limits the suitability of such modulators for use in high-bit-rate communication systems and large-area high-definition displays.

One of the factors contributing to the slow response time of liquid crystal light modulators is that most of them as heretofore proposed respond to a quadratic component of the electric field E, that is, they are $E^2$ dependent. Once the field (of either polarity) is removed, the liquid crystal relaxes to its zero-field state. These relaxation times are typically long and not electrically controllable.

There are two known references which disclose a linear or polarity-sensitive electric-field effect in a liquid crystal material. G. E. A. Durand et al in U.S. Pat. No. 4,564,266 disclose an electro-optic device in which different alignment layers are utilized to impose parallel and perpendicular orientations on the molecules at opposed surfaces of a liquid crystal layer. In operation, the Durand et al device requires electrodes that are transversely arranged with respect to the direction of light propagation through the device. For a large-area display that includes a layer of liquid crystal material that is only, for example, about 10 micrometers thick, such an electrode array is generally not feasible.

The second known reference that discloses a linear electric-field effect in a liquid crystal material is an article by N. V. Madhusudana et al entitled "Linear Flexo-Electro-Optic Effect In A Hybrid Aligned Nematic Liquid Crystal Cell", *J. Physique Lett.*, Vol. 46, 1985, pages L195–L200. As in the aforecited Durand et al patent, different alignment layers are utilized to impose parallel and perpendicular orientations on the molecules at opposed surfaces of a liquid crystal layer. Due to a bulk effect in the material, the molecular orientation can be altered by applying an electric field perpendicular to the liquid crystal surfaces. No particular device applications for such an arrangement are suggested in the article.

Moreover, in both of the aforecited references, linear operation is limited to low voltages to avoid dielectric contributions that are polarity-insensitive. Accordingly, the speed of operation of the devices described therein is relatively slow in the linear region.

SUMMARY OF THE INVENTION

In accordance with the principles of the present invention, asymmetry is established in the interfacial interactions between the surfaces of a liquid crystal material and alignment layers respectively disposed in contact with the surfaces of the material. Such asymmetry is introduced in the form of either different anchoring strengths or different angular tilts of the liquid crystal molecules at the two surfaces. Accordingly, in either case, in response to the application of an electric field perpendicular to the surfaces of the liquid crystal material, different curvatures of the contour of the longitudinal axes of the liquid crystal molecules are thereby established at the two surfaces. In particular, the different curvatures of the molecular orientations thereby established at the two surfaces are each less than about 45 degrees. As a result of this asymmetrical orientation, the flexo-electrically induced net polarization in the liquid crystal material caused by one polarity of applied field is different from that caused by the other field polarity. In that way, a polarity-sensitive electro-optic effect in the liquid crystal material is realized, thereby providing a basis for fast electrically controlled operation of a light modulator that includes such a material.

In one embodiment of the invention, different anchoring strengths are established at the two surfaces of the liquid crystal material by utilizing two different materials as the alignment layers. In other embodiments, the same material is used for each of the alignment layers but various techniques such as oblique evaporation, controlled rubbing or electrical biasing are employed to ensure that molecules at the two surfaces of the liquid crystal material exhibit different tilt angles.

BRIEF DESCRIPTION OF THE DRAWINGS

A complete understanding of the present invention and of the above and other features and advantages thereof will be apparent from a consideration of the detailed description set forth below taken in conjunction with the accompanying drawing, not drawn to scale, in which.

DETAILED DESCRIPTION

Figure 1:
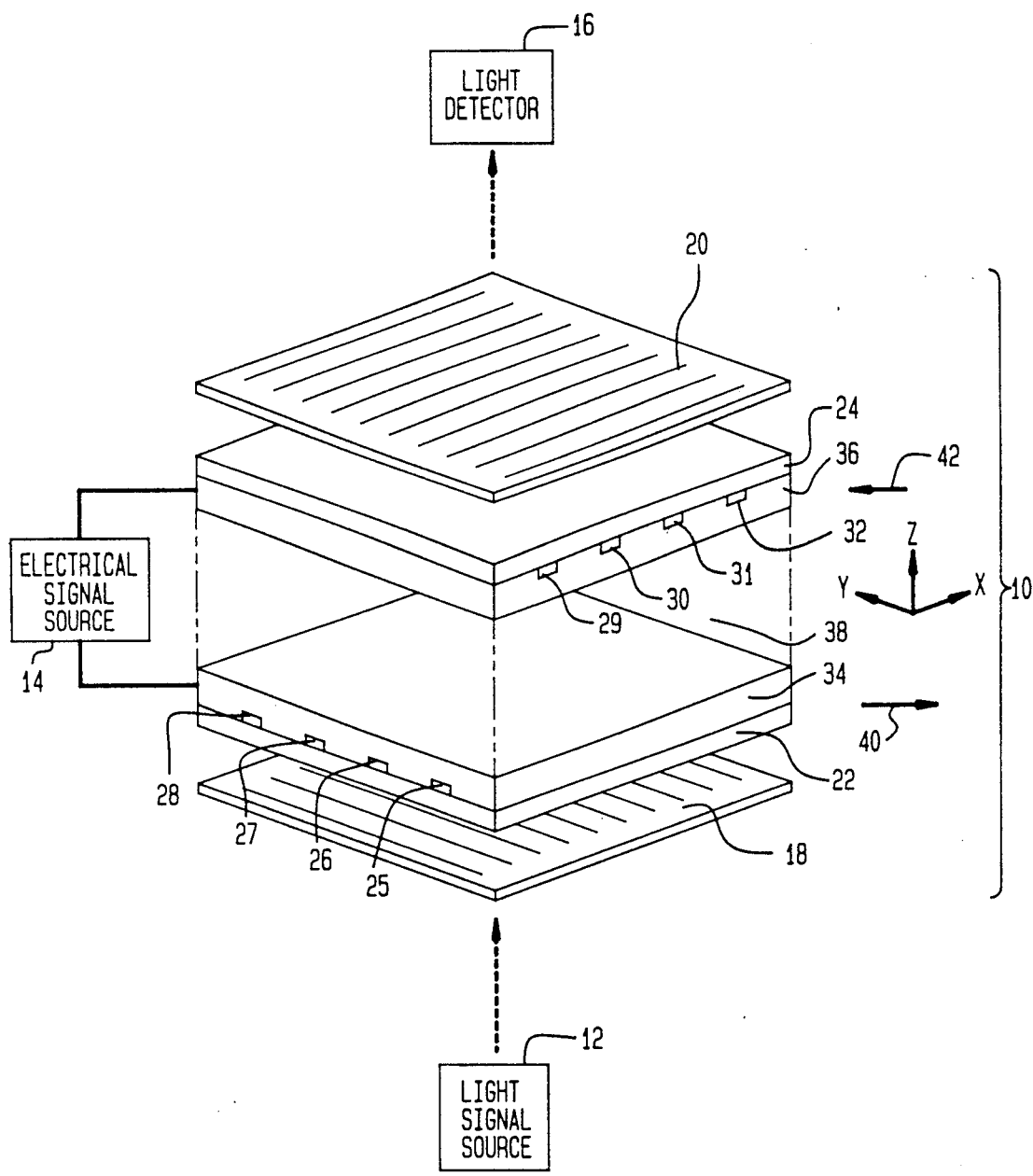
FIG. 1 is a simplified diagrammatic representation of a light modulator made in accordance with the principles of the present invention.

A specific illustrative light modulator 10 made in accordance with the principles of the present invention is represented in FIG. 1. Light signals from a source 12 are directed at the bottom surface of the modulator 10. Electrical signals applied to the modulator 10 from a source 14 determine the intensity of light delivered by the modulator 10 to a light detector 16. For a particular value of applied electrical voltage of one polarity, a maximum-intensity light signal derived from the source 12 is delivered by the modulator 10 to the detector 16. For a particular value of applied electrical voltage of one polarity, a maximum-intensity light signal is applied to the detector 16. For intermediate values of applied electrical signals, other output light intensities can be obtained. For display applications, this last-mentioned mode of operation provides a so-called gray-scale capability.

The specific illustrative light modulator 10 shown in FIG. 1 includes conventional polarizer and analyzer plates 18 and 20, respectively. By way of example, the polarizer plate 18 is designed to allow passage therethrough only of those components of the input light provided by the source 12 that are linearly polarized parallel to the indicated Y axis. Further, the analyzer plate 20 is designed to allow passage therethrough only of those components of the light propagating through the modulator 10 that are linearly polarized parallel to the X axis. Thus, only if the electrical signal applied to the modulator is effective to modify the polarization of light admitted by the polarizer plate 18 by 90 degrees will virtually all of the admitted light pass through the analyzer plate 20 and be applied to the detector 16. Illustratively, a positive electrical signal of a specified value is effective to cause such a 90-degree rotation, and a negative electrical signal of a specified value is effective to ensure that no rotation occurs. In the latter case, virtually all of the light admitted through the plate 18 will be blocked from passing through the plate 20 to the detector 16.

The light modulator 10 of FIG. 1 further includes spaced-apart transparent glass plates 22 and 24. Illustratively, the plates 22 and 24 each have deposited thereon either a continuous electrode or an array of electrodes. In the particular embodiment represented in FIG. 1, each of the plates 22 and 24 includes an array of transparent spaced-apart electrodes. Thus, for example, the plate 22 includes electrodes 25 through 28, and the plate 24 includes electrodes 29 through 32. As indicated, the sets of electrodes on the plates 22 and 24 are orthogonally disposed with respect to each other thereby to form a matrix array of electrodes. Such an array facilitates electrical control of the depicted modulator by the electrical signal source 14.

Also disposed on each of the plates 22 and 24 of FIG. 1 is a layer of a so-called alignment material whose nature and function will be described in detail later below. Thus, the plate 22 includes a layer 34 of alignment material, whereas the plate 24 includes a layer 36 of alignment material.

Still further, the light modulator 10 of FIG. 1 includes a layer 38 of liquid crystal material disposed in the space between the alignment layers 34 and 36. In practice, the layer is, of course retained in the indicated space by a conventional annular member (not shown). Illustratively, the thickness of the layer 38 is only about 10 micrometers. In one particular illustrative embodiment, the layer 38 comprises a standard nematic liquid crystal material having elongated rod-like molecules characterized by positive dielectric anisotropy.

In one specific embodiment of the invention, the layers 34 and 36 shown in FIG. 1 respectively comprise different known alignment materials. In particular, each of the alignment materials is selected to exhibit a different anchoring strength or binding force with respect to the molecules of the liquid crystal material in the layer 38. In that way, an asymmetrical interfacial interaction is established between the different alignment materials and the respective opposed surfaces of the liquid crystal material.

Moreover, in the herein-described specific embodiment, each of the alignment layers 34 and 36 of FIG. 1 is advantageously rubbed in a particular fashion to impose a specified orientation on the molecules of the liquid crystal layer 38. Such rubbing of alignment layers to control the molecular orientation of liquid crystal materials is well known in the art. Illustratively, the layers 34 and 36 are respectively rubbed in anti-parallel directions in the X-Y plane at an angle of about 45 degrees with respect to each of the X and Y axes, as indicated by arrows 40 and 42 in FIG. 1.

As indicated above, asymmetrical interfacial interactions (different anchoring strengths) are established at the respective surfaces of the liquid crystal layer 38 of FIG. 1. As a result, the flexoelectrically induced net polarization in the layer 38 caused by an electric field applied in the +Z direction is different from that caused by a field in the −Z direction. This results from the fact that the splay and bending of liquid crystal molecules at one surface are different from those at the other surface. Consequently, a polarity-sensitive electro-optic effect is thereby realized in the liquid crystal material.

Figure 2:
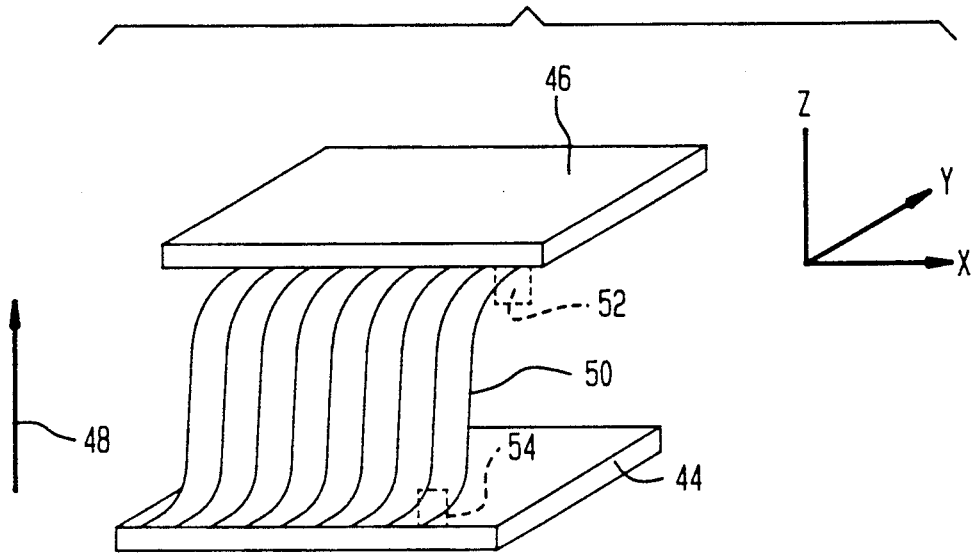
FIGS. 2 and 5 each schematically depict the contours of the longitudinal axes of liquid crystal molecules included in the FIG. 1 arrangement.

FIG. 2 is a simplified depiction that indicates the effect of an applied electric field on the molecules in the liquid crystal layer 38 of FIG. 1. Lower plate 44 in FIG. 2 schematically represents both an electrode and an alignment layer, whereas upper plate 46 is a composite representation of another electrode and an alignment layer made of a different material characterized by a different anchoring strength with respect to the molecules of the layer 38.

A voltage of one polarity is assumed to be applied between the electrodes represented in FIG. 2 thereby to establish an electric field in the direction of arrow 48 in at least a portion of the liquid crystal material contained between the plates 44 and 46. In FIG. 2, the multiple identical curved lines that extend between the plates 44 and 46 indicate the contours assumed by the longitudinal axes of the liquid crystal molecules in response to the applied electric field. As represented, for example, by the contour line 50, each of the curved lines has a curvature in the X-Z plane in the upper region of the liquid crystal material that is different from the curvature in the lower region of the material.

Figure 3:
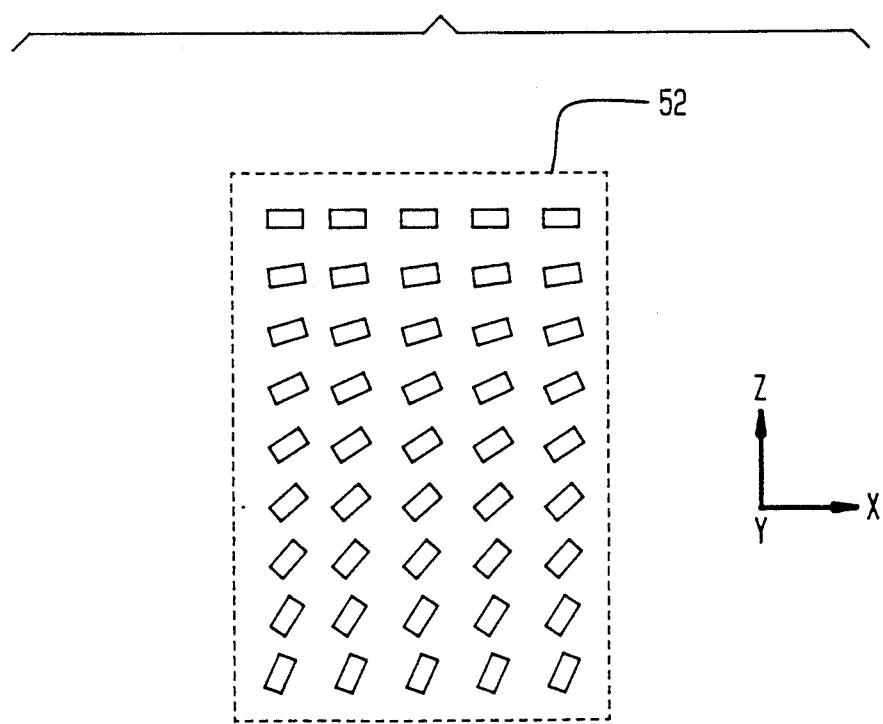
FIGS. 3 and 4 show the orientation of individual molecules at the upper and lower surfaces, respectively, of the liquid crystal material contained in the FIG. 2 depiction.

The orientation of liquid crystal molecules in an upper portion of the FIG. 2 depiction adjacent to the plate 46 is shown in more detail in FIG. 3. More specifically, the orientation of molecules within dash-line box 52 of FIG. 2 is diagrammatically shown in simplified form in FIG. 3. Each of the liquid crystal molecules represented in the box 52 of FIG. 3 is shown as an elongated rod. By way of example, the longitudinal axes of the molecules in the first row of FIG. 3 are each shown as still being approximately parallel to the indicated X axis, due to the relatively large anchoring strength imposed thereon by the alignment material included in the upper plate 46 of FIG. 2. (In the absence of an applied field, all the longitudinal axes of the liquid crystal molecules are approximately parallel to the X axis.) But, as the distance from the plate 46 increases, it is apparent from FIG. 3 that the applied electric field gradually overcomes the effect of the anchoring strength. At a point approximately equidistant between the plates 44 and 46, the longitudinal axes of the liquid crystal molecules are approximately parallel to the Z axis.

Figure 4:
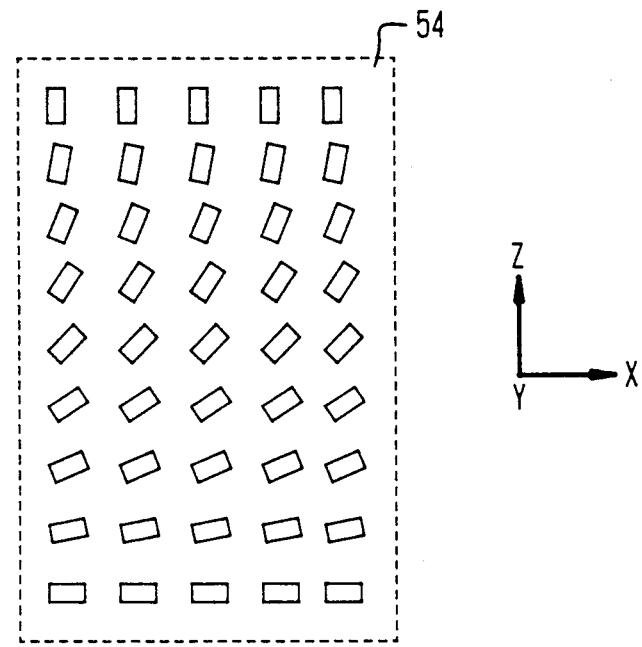

Similarly, the orientation of liquid crystal molecules in a lower portion of FIG. 2 adjacent the plate 44 is shown in more detail in FIG. 4. Specifically, the orientation of molecules within dash-line box 54 of FIG. 2 is diagrammatically shown in FIG. 4. By way of example, the longitudinal axes of the molecules in the last row of FIG. 4 are each shown approximately parallel to the indicated X axis, even though the anchoring strength imposed on the molecules by the alignment material included in the lower plate 44 is assumed to be small relative to that of the alignment material in the upper plate 46. But due to this difference in anchoring strengths, it is apparent from FIG. 4 that molecules near the lower plate 44 are less gradually oriented toward parallelism with the Z axis as the distance from the plate increases into the bulk the liquid crystal material than is the case in the FIG. 3 depiction.

Figure 5:
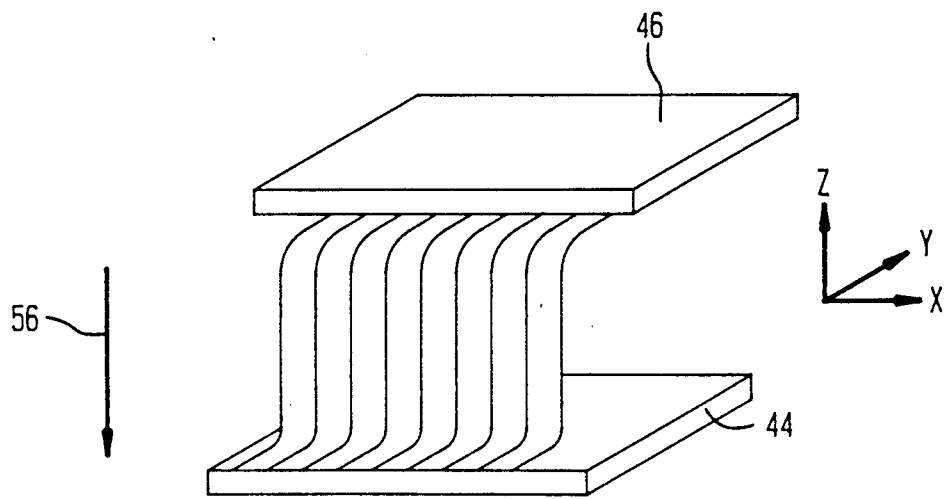

FIG. 5 is a depiction that is similar to that of FIG. 2. But in FIG. 5 the direction of the applied electric field is reversed, as indicated by arrow 56. As a result, as represented by the curved lines shown in FIG. 5, the contours of the longitudinal axes of the liquid crystal molecules again have a curvature in the X-Z plane in the upper region of the liquid crystal material that is different from the curvature in the lower region of the material. Significantly, however, due to the aforedescribed asymmetrical interfacial interactions, these different curvatures in the upper and lower regions of FIG. 5 are respectively different from the curvatures in the lower and upper regions of the arrangement represented in FIG. 2. Consequently, the net flexoelectrically induced polarization in FIG. 5 is different than that produced in the FIG. 2 case. Hence, the described liquid crystal arrangement exhibits a polarity-sensitive electro-optic effect.

In one specific illustrative embodiment of the principles of the present invention, a standard commercially available liquid crystal material that exhibits the nematic phase at room temperature is utilized to form the layer 38 of FIG. 1. By way of example, a liquid crystal material designated E7 available from EM Industries Incorporated, Advance Chemical Division, 5 Skyline Drive, Hawthorne, N.Y. 10532, is suitable for this purpose.

In the noted illustrative embodiment, two different alignment polymers are respectively deposited on the plates 22 and 24 (FIG. 1) to achieve different anchoring strengths with respect to surface regions of the aforespecified liquid crystal material. Thus, for example, layers of poly (1,4-butylene terephthalate) containing aromatic rings that resemble the cores of the liquid crystal molecules and nylon 6, 6 which resembles the tails of the liquid crystal molecules are deposited in conventional ways on the plates 22 and 24, respectively, and then rubbed in the particular manner previously described above. As a result, the liquid crystal molecules are thereby aligned with their long axes approximately parallel to the arrows 40 and 42 (FIG. 1) and, significantly, are anchored to the two noted alignment polymers with different strengths. Illustratively, the difference in anchoring strengths of the aforespecified alignment materials with respect to surface regions of the specified liquid crystal material is approximately $9.0 \times (10^{-2} - 10^{-4})$ ergs per centimeter square.

In general, a difference in anchoring strengths of at least about $1 \times 10^{-4}$ ergs per centimeter square is required in a light modulator made in accordance with the present invention. In practice, such a difference is effective to provide the asymmetrical interfacial interactions which provide the basis for the herein-described polarity-sensitive control of the electro-optic properties of a liquid crystal material.

In accordance with the invention, both quiescently and in the presence of an applied electric field of either polarity, at least one layer of liquid crystal molecules at each surface of the layer 38 (FIG. 1) has its longitudinal axes disposed at an angle of about 45 degrees or less with respect to the X-Y plane depicted in the drawing. In the particular depictions of FIGS. 3 and 4, this angle is shown as being approximately 0 degrees.

In accordance with the invention, techniques other than the one described above based on different anchoring strengths are available for establishing the asymmetrical interfacial interactions required for polarity-sensitive operation of a light modulator that includes a liquid crystal material. These other techniques all cause the longitudinal axes of molecules at one surface of the liquid crystal material to be quiescently tilted at an angle that is different from that of the longitudinal axes of the molecules at the other surface. Both quiescently and in the presence of an applied electric field, at least one layer of liquid crystal molecules at each surface has its longitudinal axes thereby disposed at an angle of about 45 degrees or less with respect to the X-Y plane (FIGS. 3 and 4). By so establishing different tilt angles, these other techniques ensure that the electro-optic effects caused in the material by an applied electric field will be asymmetrical with respect to field reversal. In practice, a difference in tilt angle of about two degrees is adequate to achieve the desired asymmetrical effect. As this difference increases, so too does the asymmetrical effect.

One technique for achieving different tilt angles of the molecules in surface regions of the liquid crystal layer 38 (FIG. 1) involves employing more force during rubbing of one of the alignment layers 34 and 36 than during rubbing of the other layer. Or the same asymmetrical effect can be achieved by rubbing each of the alignment layers with the same force but with a different material. In either of these cases, the same alignment material may be used for the layers 34 and 36.

In accordance with the invention, another technique for achieving different molecular tilt angles involves no rubbing and using the same alignment material for each of the layers 34 and 36. In this technique, a material such as silicon oxide is sputtered onto the plate 22 (FIG. 1) at an oblique angle with respect to the indicated X-Y plane and sputtered onto the plate 24 at a different oblique angle. Deposited material so oriented is effective to impose different tilt angles on liquid crystal molecules at the respective surfaces of the layer 38.

A still further technique is practicable for achieving different molecular tilt angles. This involves applying a constant direct-current bias voltage across the liquid crystal layer 38 shown in FIG. 1. Thus, for example, assume that a bias voltage of $-V/3$ volts is applied from the source 14 via an electrode to the top of the layer 38 and that the bottom of the layer 38 is connected to the source 14 via another electrode to a point of reference potential such as ground. Asymmetrical interfacial interactions in the form of different quiescent molecular tilt angles are thereby established at the two liquid crystal surfaces. Assume further that a symmetrical control voltage that varies between $+V$ and $-V$ is then applied across the biased layer 38. As a result of the offset caused by the bias voltage, an asymmetrical net voltage that varies between $+2V/3$ and $-4V/3$ will thereby be applied across the layer 38. In turn, the electro-optic effect produced in the layer 38 is thus different for the positive and negative-going excursions of a bipolar control voltage.

Finally, it is to be understood that the above-described procedures and arrangements are only illustrative of the principles of the present invention. In accordance with these principles, numerous modifications and alternatives may be devised by those skilled in the art without departing from the spirit and scope of the invention.

What is claimed is:

1. A light modulator comprising
   a layer of a liquid crystal material comprising molecules each having a principal axis, said layer having opposed interfacial surfaces,
   means for applying electric fields of opposite polarities and of equal magnitude across said layer in a direction essentially perpendicular to said interfacial surfaces,
   and means for establishing, both quiescently in the absence of an applied electric field and in the presence of an applied electric field, asymmetrical interfacial interactions with respect to said liquid crystal material to cause the principal axes of substantially all of said liquid crystal molecules at each of said interfacial surfaces to form an angle with the respective interfacial surface that is less than about 45 degrees.

2. A modulator as in claim 1 wherein said means for establishing asymmetrical interfacial interactions comprises different alignment materials in contact with said liquid crystal layer for establishing different anchoring strengths with respect to liquid crystal molecules at said interfacial surfaces.

3. A modulator as in claim 2 wherein said liquid crystal material comprises elongated molecules each having a longitudinal axis.

4. A modulator as in claim 2 wherein said liquid crystal material comprises a nematic liquid crystal.

5. A modulator as in claim 4 wherein one of said alignment materials comprises poly (1,4-butylene terephthalate) and the other alignment material comprises nylon 6, 6.

6. A modulator as in claim 2 wherein said means for applying an electric field across said layer comprises a first set of spaced-apart electrodes adjacent one surface of said layer and a second set of spaced-apart electrodes adjacent the other surface of said layer, said first and second sets of electrodes being orthogonally disposed with respect to each other.

7. A modulator as in claim 1 wherein said means for establishing asymmetrical interfacial interactions comprises means for quiescently orienting the principal axes of the molecules of said liquid crystal material at the respective interfacial surfaces at different angles with respect to said interfacial surfaces.

8. A modulator as in claim 7 wherein said means for orienting comprises identical materials which have been aligned by being rubbed with respectively different forces.

9. A modulator as in claim 7 wherein said means for orienting comprises identical materials which have been prepared by being rubbed with respectively different materials.

10. A modulator as in claim 7 wherein said means for orienting comprises identical materials which have been obliquely deposited on support plates at respectively different angles with respect to the interfacial surfaces of said liquid crystal layer.

11. A modulator as in claim 10 wherein the material so deposited comprises silicon oxide.

12. A modulator as in claim 7 wherein said means for orienting comprises means for applying a constant electrical bias field across said liquid crystal layer.

13. A modulator as in claim 1 further including
    a polarizer for allowing only light polarized parallel to a specified direction to be applied to said liquid crystal layer,
    and an analyzer for passing only light propagated through said layer whose polarization has been rotated by 90 degrees.

14. A modulator as in claim 13 wherein said means for establishing asymmetrical interfacial interactions comprises alignment materials in contact with said liquid crystal layer for quiescently orienting the longitudinal axes of the molecules of said layer at an angle of approximately 45 degrees with respect to said specified direction.

15. A modulator as in claim 14 wherein said means for applying an electric field across said layer comprises a first set of spaced-apart electrodes adjacent one surface of said layer and a second set of spaced-apart electrodes adjacent the other surface of said layer, said first and second sets of electrodes being orthogonally disposed with respect to each other.

* * * * *